US008278872B2

(12) United States Patent
Li

(10) Patent No.: US 8,278,872 B2
(45) Date of Patent: Oct. 2, 2012

(54) CHARGING DEVICE

(75) Inventor: Jian-Hui Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 444 days.

(21) Appl. No.: 12/685,041

(22) Filed: Jan. 11, 2010

(65) Prior Publication Data

US 2010/0264873 A1    Oct. 21, 2010

(51) Int. Cl.
*H02J 7/00* (2006.01)
*H02K 1/22* (2006.01)
(52) U.S. Cl. ......... 320/108; 320/107; 320/109; 310/266
(58) Field of Classification Search .................... 320/108
See application file for complete search history.

(56) References Cited

U.S. PATENT DOCUMENTS

| | | | | |
|---|---|---|---|---|
| 5,801,473 A * | 9/1998 | Helwig | ................... | 310/216.061 |
| 6,617,825 B2 * | 9/2003 | Chu | ............................... | 320/114 |
| 6,992,415 B2 * | 1/2006 | Cibie | .............................. | 310/81 |
| 7,102,258 B2 * | 9/2006 | Shen | ................................ | 310/50 |
| 2011/0012459 A1 * | 1/2011 | Chang et al. | ................... | 310/113 |

* cited by examiner

*Primary Examiner* — Yalkew Fantu
(74) *Attorney, Agent, or Firm* — Altis Law Group, Inc.

(57) ABSTRACT

A charging device comprises a rotating unit, an axle unit assembled to the rotating unit and engaging the rotating unit, and two charging units assembled to the axle unit. Each charging unit includes a magnet retainer assembled to the axle unit and engaging the axle unit, a plurality of magnets received in the magnet retainer, and a case rotatably assembled to the axle unit and including a plurality of windings. Rotation of the rotating unit drives the axle unit and the magnet retainers to rotate, the rotating magnet retainers and magnets further rotate relative to the cases due to the inertia of the cases, and the magnets move relative to the windings and generate induction currents in the windings, for charging a battery.

20 Claims, 3 Drawing Sheets

CHARGING DEVICE

BACKGROUND

1. Technical Field

The present disclosure relates to charging devices, and particularly to a charging device integrated into a rolling device, object, or toy, such as a diabolo.

2. Description of Related Art

Rechargeable batteries are widely used in portable electronic devices, such as mobile phones, personal digital assistants (PDA), and laptop computers, and others. When the power of the rechargeable batteries is exhausted, the batteries can be connected to charging devices for recharging.

Generally, most conventional charging devices can only be used to connect the batteries with other power supplies (e.g., wall sockets) and input electric power of the power supplies to the batteries. The charging devices themselves are not able to provide electric power to the batteries. Therefore, the charging devices cannot be used to charge the batteries without being connected to other power supplies.

Therefore, there is room for improvement within the art.

BRIEF DESCRIPTION OF THE DRAWINGS

Many aspects of the present charging device can be better understood with reference to the following drawings. The components in the various drawings are not necessarily drawn to scale, the emphasis instead being placed upon clearly illustrating the principles of the present charging device. Moreover, in the drawings, like reference numerals designate corresponding parts throughout the figures.

DETAILED DESCRIPTION

Figure 1:
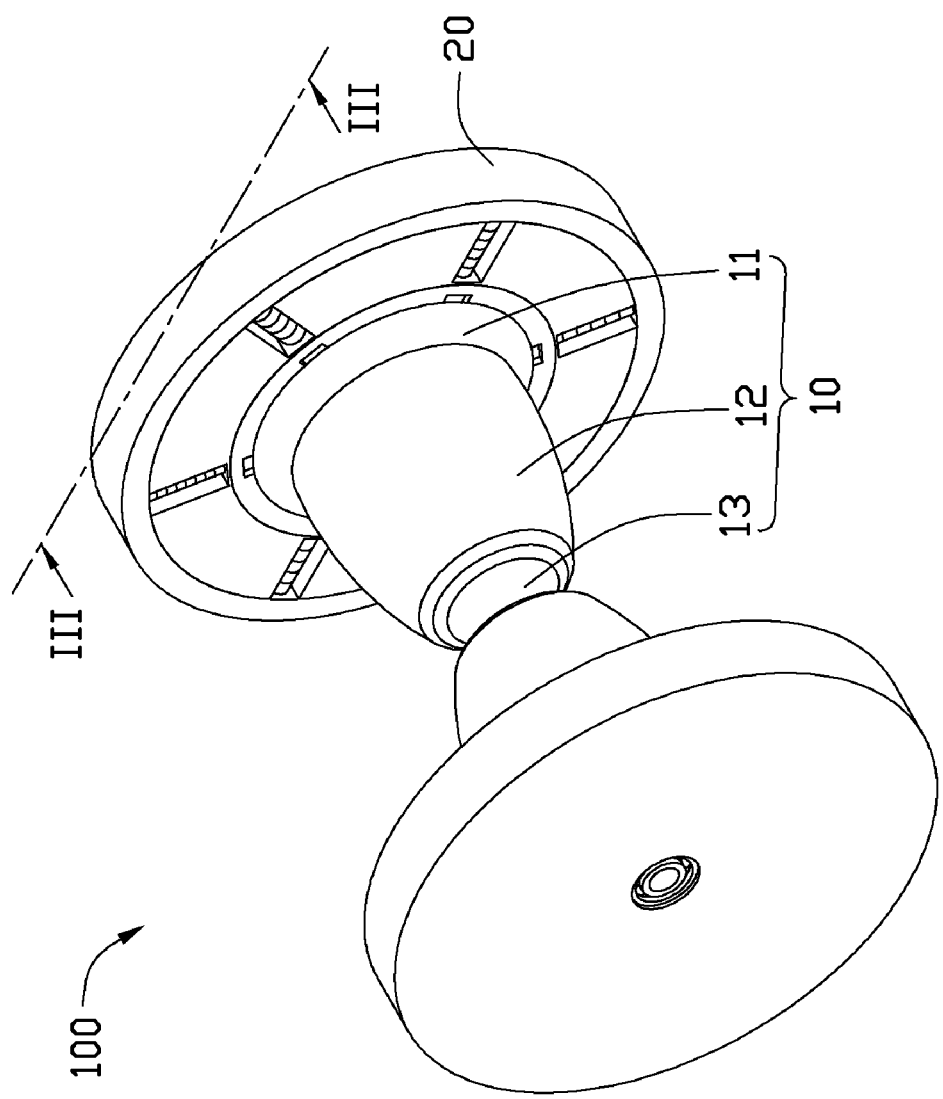
FIG. 1 is an assembled view of a charging device, according to an exemplary embodiment.
Figure 2:
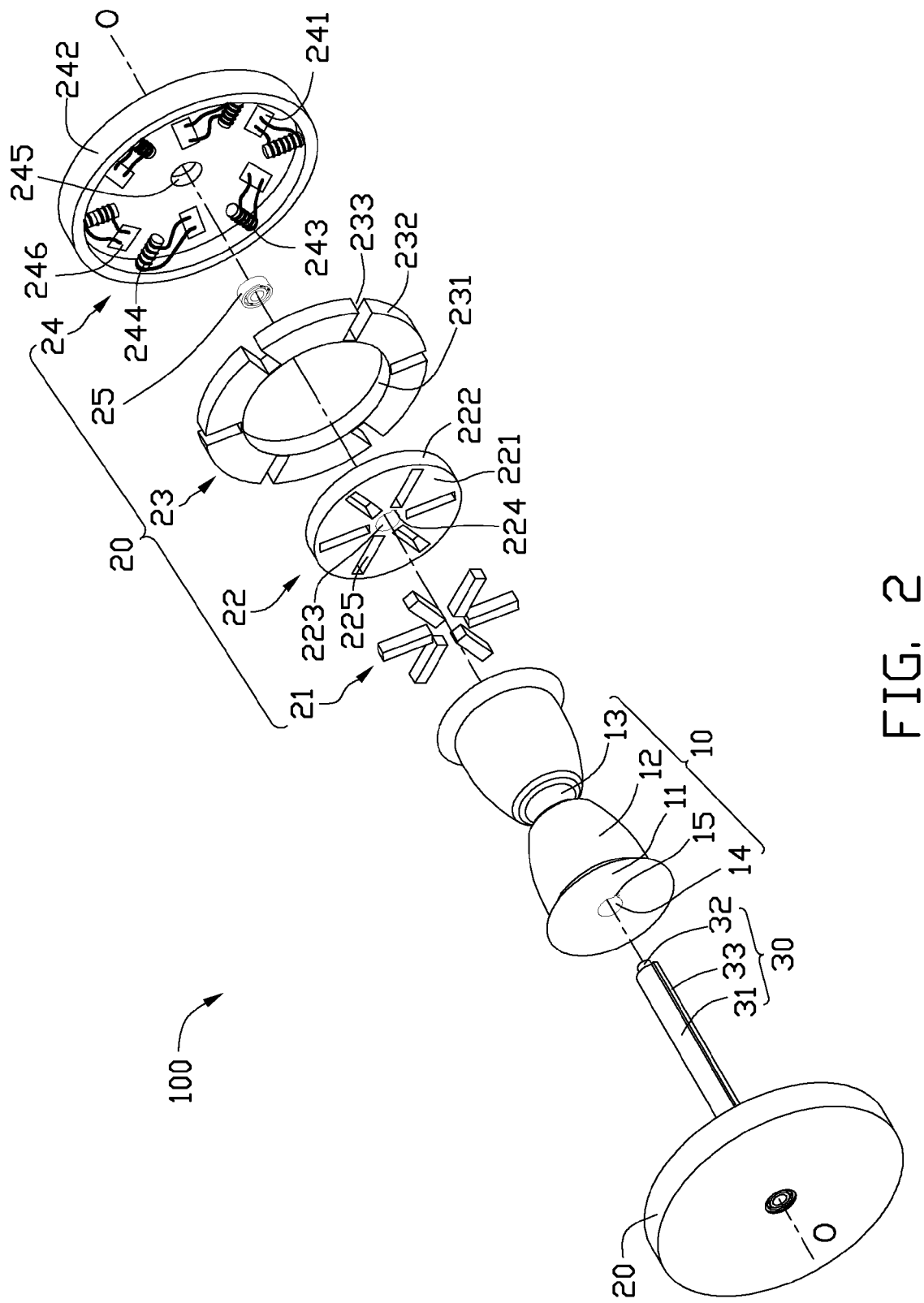
FIG. 2 is a disassembled view of the charging device shown in FIG. 1.
Figure 3:
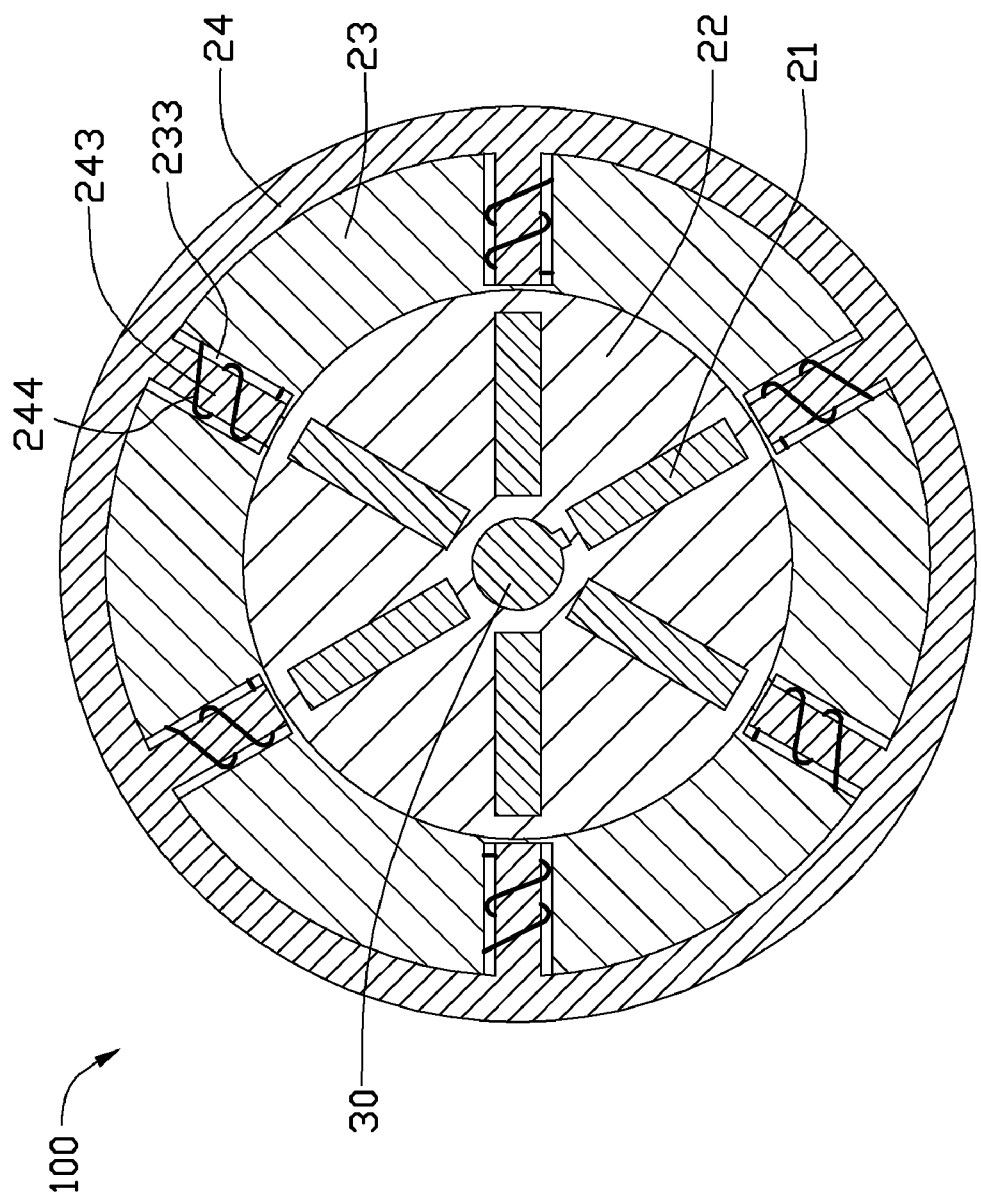
FIG. 3 is a cutaway view along the line III-III shown in FIG. 1.

FIG. 1 and FIG. 2 schematically show a charging device 100, according to an exemplary embodiment and in the form of a diabolo toy. The charging device 100 can be used to charge batteries of mobile phones, personal digital assistants (PDA), laptop computers, and other devices while the diabolo is used as a toy. The charging device 100 includes a rotating unit 10, two charging units 20, and an axle unit 30. The rotating unit 10 and the two charging units 20 are all assembled to the axle unit 30, and the rotating unit 10 is positioned between the two charging units 20.

The rotating unit 10 includes two disks 11, two main rotating members 12, and a connecting member 13. The connecting member 13 is approximately cylindrical. The two main rotating members 12 are approximately frustums of cones. The connecting member 13 is located between the smaller ends of the two main rotating members 12 to connect the two main rotating members 12 with each other, and the connecting member 13 and the two rotating members 12 are positioned to be coaxial. The two disks 11 are respectively coaxially connected to the larger ends of the two main rotating members 12. Thus, the connecting member 13, the two main rotating members 12, and the two disks 11 share an axis O-O. The rotating unit 10 defines a first axle hole 14 and a first holding groove 15 therein. Both the first axle hole 14 and the first holding groove 15 run through the rotating unit 10 and communicate with the outside surfaces of the two disks 11. The first axle hole 14 extends along the axis O-O, and the first holding groove 15 extends parallel to the axis O-O and communicates with the first axle hole 14.

Each charging unit 20 includes a plurality of magnets 21, a magnet retainer 22, a holding ring 23, a case 24, and a bearing 25. The magnets 21 can be bar-shaped or cylindrical-shaped permanent magnets. The magnet retainer 22 is a disk that includes a round mounting surface 221 and a cylindrical side surface 222. The magnet retainer 22 includes a second axle hole 223 and a second holding groove 224 therein. The second axle hole 223 and the second holding groove 224 are similar to the first axle hole 14 and the first holding groove 15, correspondingly. Both the second axle hole 223 and the second holding groove 224 run through the disk 22. The second axle hole 223 extends along the axis of the magnet retainer 22. The second holding groove 224 extends parallel to the axis of the magnet retainer 22 and communicates with the second axle hole 223. The magnet retainer 22 further defines a plurality of straight magnet grooves 225 corresponding to the magnets 21 in the mounting surface 221 for receiving the magnets 21. The magnet grooves 225 are arranged radially, that is, along the radii of the magnet retainer 22 and equidistantly.

The holding ring 23 includes a cylindrical inner surface 231 and a cylindrical outer surface 232. The inner surface 231 is configured to correspond to the side surface 222 of the magnet container 22, such that the magnet container 22 can be received in the holding ring 23 and rotate in the holding ring 23. The holding ring 23 defines a plurality of straight assembly grooves 233 therein. The assembly grooves 233 are arranged radially, that is, along the radii of the holding ring 23 and equidistantly.

The case 24 includes a disk-shaped baseboard 241, a cylindrical sidewall 242, a plurality of winding axles 243, and a plurality of windings 244. One end of the sidewall 242 is perpendicularly connected to a round surface of the baseboard 241. The inner surface of the sidewall 242 is configured to correspond to the outer surface 232 of the holding ring 23, such that the holding ring 23 can be received in the case 24. The baseboard 241 defines a round third axle hole 245 in a central portion thereof. Each winding axle 243 has an end connected to an inner surface of the sidewall 242. The winding axles 243 are arranged radially, that is, parallel to the radii of the baseboard 241 and/or the sidewall 242, and equidistantly. The windings 244 are coiled on the winding axles 243. The lengths of the winding axles 243 are less than or equal to the depths of the assembly grooves 233, and the outer diameters of the winding axles 243 and the windings 244 are less than or equal to the widths of the assembly grooves 233. Thus, the winding axles 243 with the windings 244 coiled thereon can be received in the assembly grooves 233. The baseboard 241 further defines a plurality of battery grooves 246 having battery terminals electrically connected to the windings 244. Conventional charging circuits (not shown), such as rectifier circuits, amplifier circuits, and connectors, are installed in the battery grooves 246 and electrically connected to the windings 244.

The bearing 25 can be a ball bearing or a roller bearing, or others. The bearing 25 is a ring. An outer diameter of the bearing 25 equals the diameter of the third axle hole 245.

The axle unit 30 includes a main axle 31, two extending portions 32, and a driving flange 33. The main axle 31 is a cylinder corresponding to the first axle hole 24 and the second axle hole 223, and a length of the main axle 31 equals a length of the rotating unit 10. The extending portions 32 are cylinders corresponding to an inner diameter of the bearings 25 and coaxially connected to two ends of the main axle 31. A diameter of each extending portion 32 can be less than or equal to the diameter of the main axle 31. The driving flange 33 is a flange protruding from the side surface of the main axle 32 and corresponding to the first holding groove 15 and the second holding groove 224.

During assembly, the axle unit 30 is assembled to the rotating unit 10. The main axle 31 and the driving flange 33 are respectively received into the first axle hole 14 and the first holding groove 15, and the extending portions 32 are respectively exposed from the outer surfaces of the two disks 11. Thus, the axle unit 30 engages the rotating unit 10 by the driving flange 33.

The holding rings 23 are respectively received in the cases 24, and rechargeable batteries (not shown) can be received in the battery grooves 246 and electrically connected to the charging circuits by the battery terminals. The winding axles 243 with the windings 244 coiled thereon are correspondingly received in the assembly grooves 233. The magnets 21 are respectively received in the magnet grooves 245, and the magnet retainers 22 are respectively rotatably received in the holding rings 23. The bearings 25 are respectively received in the third axle holes 245. Finally, the two charging units 20 are respectively positioned at two ends of the axle unit 30 and assembled to the axle unit 30. The main axle 31 and the holding flange 33 are respectively received in the second axle holes 223 and the second assembly grooves 224, such that the axle unit 30 engages the two magnet retainers 22 by the driving flange 33. The exposed extending portions 32 are respectively rotatably received in the bearings 25, such that the bearings 25 and the cases 24 are rotatably mounted to the axle unit 30. Conventional axial holding mechanisms (not shown) can be connected to the ends of the extending portions 32 and/or mounted on the outer surface of the baseboard 241 to prevent the charging units 20 from sliding along the axis O-O. Thus, the charging device 100 is completed.

In use, the charging device 100 can be operated as a conventional diabolo, such as by rotation. The user of the charging device 100 rotates the connecting member 13 and the main rotating members 12. The rotation of the rotating unit 10 drives the driving flange 33 to rotate rotating unit 10, and, in turn, the main axle 31. The rotation of the main axle 31 and the driving flange 33 drives the magnet retainers 22 and the magnets 21 received in the magnet retainer 22 to rotate. The rotating magnet retainers 22 and magnets 21 further rotates relative to the holding rings 23, the cases 24 and the bearings 25 due to the inertia of the holding rings 23, the cases 24 and the bearings 25. Thus, the magnets 21 move relative to the windings 244 and generate induction currents in the windings 244. Charging circuits connected to the windings 244 as described and rechargeable batteries connected to the charging circuits in the cases 24, the induction currents can be regulated and supplied to recharge any batteries positioned within the charging device 100'.

In the present disclosure, either of the two charging units 20 can be omitted. Additionally, the bearings 25 can be omitted, and the diameter of the extending portions 32 configured to equal the diameter of the third axle hole 245, correspondingly. The magnet grooves 225 can be configured to run through the magnet retainer 22. The battery grooves 246 can also be defined in the holding rings 23.

The charging device 100 transforms kinetic energy into electric energy. Despite there the absence of another power supply, the charging device 100 can recharge batteries, in addition to functioning as a conventional diabolo apparatus.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A charging device, comprising:
a rotating unit;
an axle unit assembled to the rotating unit and engaging the rotating unit to coaxially hold the rotating unit on a middle portion of the axle unit; and
two charging units, each charging unit coaxially assembled to one of the two opposite ends of the axle unit, each charging unit including a magnet retainer assembled to the axle unit and engaging the axle unit, a plurality of magnets received in the magnet retainer, and a case rotatably assembled to the axle unit and including a plurality of windings; wherein rotation of the rotating unit drives the axle unit and the magnet retainers to rotate, the rotating magnet retainers and magnets further rotate relative to the cases due to the inertia of the cases, and the magnets move relative to the windings and generate induction currents in the windings, for charging a battery; and
wherein a diameter of any portion of the rotating unit is less than a diameter of the magnet retainer of each of the two charging units.

2. The charging device as claimed in claim 1, wherein the rotating unit includes two disks, two main rotating members shaped as frustums of cones, and a cylindrical connecting member, each of the two main rotating members including a smaller end and a larger end, diameters of the two disks being greater than diameters of the larger ends of the two main rotating members, and a diameter of the connecting member being less than diameters of the smaller ends of the two main rotating members; the connecting member connected between the smaller ends of the two main rotating members, the two disks respectively connected to the larger ends of the two main rotating members, and the connecting member, the two rotating members, and the two disks positioned to be coaxial.

3. The charging device as claimed in claim 1, wherein the rotating unit defines a first axle hole and a first holding groove therein, the axle unit received in the first axle hole and the first holding groove.

4. The charging device as claimed in claim 3, wherein the axle unit includes a main axle received in the first axle hole and a holding flange received in the first holding groove, and engages the rotating unit by the holding flange.

5. The charging device as claimed in claim 4, wherein the magnet retainer defines a second axle hole and a second holding groove therein, the main axle is received in the first axle hole and the holding flange received in the second holding groove, such that the axle unit engages the magnet retainer by the holding flange.

6. The charging device as claimed in claim 1, wherein the magnet retainer of each of the two charging units is a disk defining a plurality of magnet grooves therein, in which the magnets are received, and has a greater diameter than each of the two disks of the rotating unit; and each magnet retainer is coaxially held at one of the two opposite ends of the axle unit and positioned proximate to one of the two disks of the rotating unit.

7. The charging device as claimed in claim 6, wherein the case includes a baseboard defining a third axle hole therein, and the axle unit received in the third axle hole rotatably assembles the case to the axle unit.

8. The charging device as claimed in claim 7, wherein the case further includes a cylinder sidewall and a plurality of winding axles; one end of the sidewall perpendicularly connected to the baseboard, each winding axle having an end connected to an inner surface of the sidewall, and the windings coiled on the winding axles.

9. The charging device as claimed in claim 8, wherein each charging unit further includes a holding ring, each holding ring defining a plurality of assembly grooves corresponding to the winding axles and the windings therein; the magnet retainers respectively rotatably received in the holding rings, the holding rings respectively received in the cases, and the winding axles with the windings coiled thereon correspondingly received in the assembly grooves.

10. The charging device as claimed in claim 7, wherein each charging unit further includes a bearing, the axle unit includes two cylindrical extending portions formed on two ends thereof, the bearings are respectively received in the third axle holes of the two cases, and the extending portions are respectively rotatably received in the bearings.

11. The charging device as claimed in claim 7, wherein the baseboard defines a plurality of battery grooves having battery terminals electrically connected to the windings for receiving batteries therein.

12. The charging device as claimed in claim 1, wherein the charging device is further configured to function as a yo-yo apparatus.

13. A charging device, comprising:
 a rotating unit;
 an axle unit assembled to the rotating unit and engaging the rotating unit to coaxially hold the rotating unit on a middle portion of the axle unit; and
 a charging unit coaxially assembled to an end of the axle unit, the charging unit including a magnet retainer assembled to the axle unit and engaging the axle unit, a plurality of magnets received in the magnet retainer, and a case rotatably assembled to the axle unit and including a plurality of windings; wherein rotation of the rotating unit drives the axle unit and the magnet retainer to rotate, the rotating magnet retainers and magnets further rotate relative to the cases due to the inertia of the case, and the magnets move relative to the windings and generate induction currents in the windings, for charging a battery; and
 wherein a diameter of any portion of the rotating unit is less than a diameter of the magnet retainer.

14. The charging device as claimed in claim 13, wherein the rotating unit defines a first axle hole and a first holding groove therein, and the axle unit is received in the first axle hole and the first holding groove.

15. The charging device as claimed in claim 14, wherein the axle unit includes a main axle received in the first axle hole and a holding flange received in the first holding groove, and engages the rotating unit by the holding flange.

16. The charging device as claimed in claim 15, wherein the magnet retainer defines a second axle hole and a second holding groove therein, the main axle is received in the first axle hole and the holding flange received in the second holding groove, such that the axle unit engages the magnet retainer by the holding flange.

17. The charging device as claimed in claim 13, wherein the case includes a baseboard defining a third axle hole therein, and the axle unit is received in the third axle hole for rotatably assembling the case to the axle unit.

18. The charging device as claimed in claim 17, wherein the case further includes a cylinder sidewall and a plurality of winding axles; one end of the sidewall perpendicularly connected to the baseboard, each winding axle having an end connected to an inner surface of the sidewall, and the windings coiled on the winding axles.

19. The charging device as claimed in claim 18, wherein the charging unit further includes a holding ring, each holding ring defining a plurality of assembly grooves corresponding to the winding axles and the windings therein; the magnet retainers respectively rotatably received in the holding rings, the holding rings respectively received in the cases, and the winding axles with the windings coiled thereon correspondingly received in the assembly grooves.

20. The charging device as claimed in claim 17, wherein the baseboard defines a plurality of battery grooves having battery terminals electrically connected to the windings for receiving batteries therein.

* * * * *

UNITED STATES PATENT AND TRADEMARK OFFICE
CERTIFICATE OF CORRECTION

PATENT NO. : 8,278,872 B2
APPLICATION NO. : 12/685041
DATED : October 2, 2012
INVENTOR(S) : Jian-Hui Li It is certified that error appears in the above-identified patent and that said Letters Patent is hereby corrected as shown below:

On the title page, please insert Item (30) regarding "Foreign Application Priority Data" with the following:

-- (30)    Foreign Application Priority Data

Apr. 16, 2009    (CN) ......................200910301605.3 --

Signed and Sealed this
Twenty-ninth Day of October, 2013

Teresa Stanek Rea
*Deputy Director of the United States Patent and Trademark Office*